Patented Jan. 16, 1923.

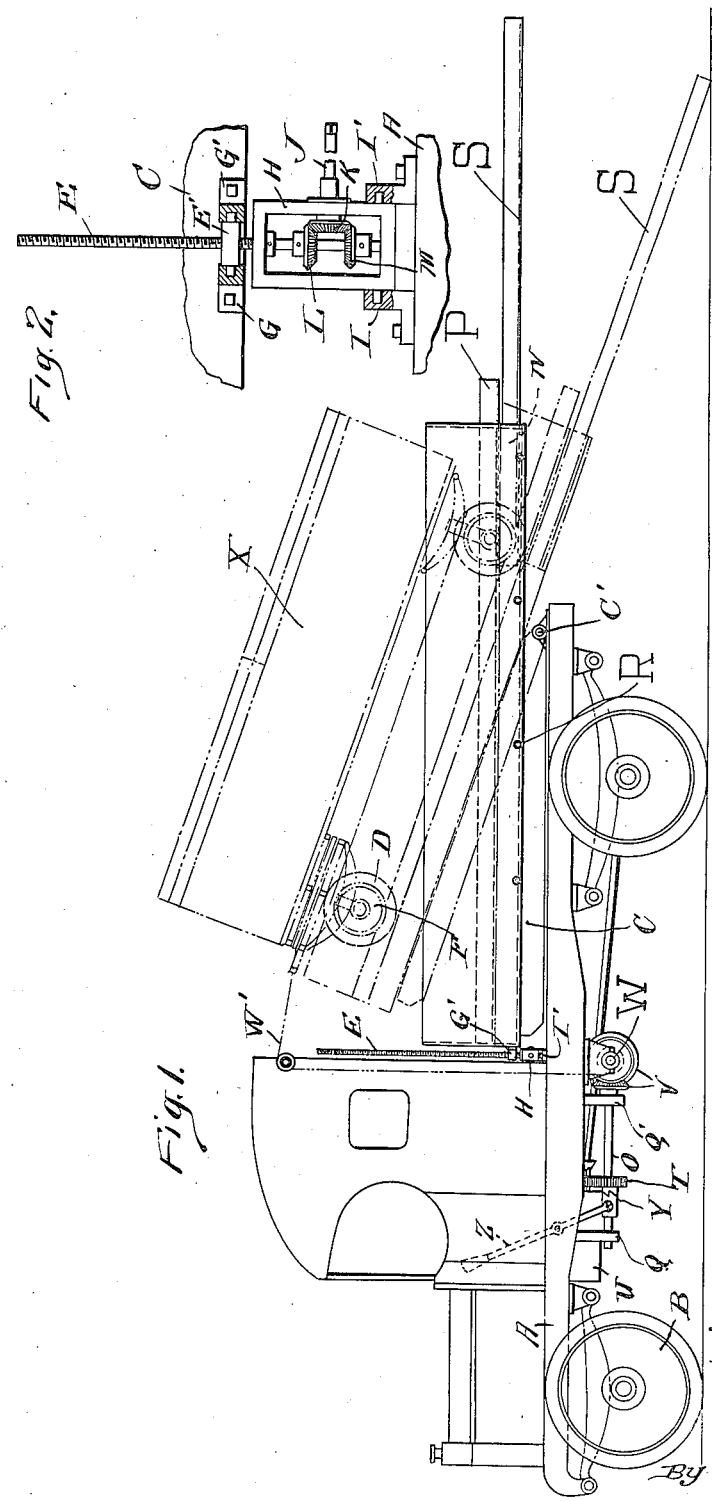

1,442,769

UNITED STATES PATENT OFFICE.

ALFRED ERNEST JACKSON AND HOWARD GOODFELLOW, OF SOUTHPORT, ENGLAND.

VEHICLE.

Application filed September 11, 1922. Serial No. 587,537.

*To all whom it may concern:*

Be it known that we, ALFRED ERNEST JACKSON and HOWARD GOODFELLOW, both residing in Southport, in the county of Lancaster and Kingdom of England, subjects of the King of Great Britain, have invented certain new and useful Vehicles, of which the following is a specification.

The present invention relates to improvements in vehicles, more particularly to automobile road vehicles.

The invention will be described more particularly with reference to an automobile road vehicle by way of example, but it is obvious that the arrangement is applicable to other vehicles, such as railway wagons.

According to the present invention a vehicle, such as an automobile, has a tipping platform thereon provided with extensions to form runways for a second vehicle, means, such as a winch, being provided to hoist the second vehicle along said runways on to the tipping platform.

The present invention will be more particularly described with reference to the drawing accompanying this specification.

In the drawing Figure 1 represents a side elevation of the vehicle, showing, in full lines, the tipping platform in its normal horizontal position, and the platform, in dotted lines, in its tipped position; while Figure 2 is a front elevation of the mechanism for elevating or lowering the front end of the tipping platform.

An automobile vehicle having a main frame or platform A and wheels B, is provided with a tipping platform C, moving about hinged pivots C' at its rear on the frame of the vehicle. At its front end, the vehicle is provided with any one of the usual mechanisms, hand or power, for elevating and lowering the front end of the tipping platform C about pivots C'. A suitable mechanism, as illustrated in detail in Figure 2, comprises a shaft E having its upper portion threaded and extending through a similarly threaded opening in a bearing-block E' pivotally mounted in brackets G and G' secured to the front of tipping platform C. The lower end of shaft E is suitably journaled in the upper and lower sides of a member H, the latter being pivotally mounted in brackets I and I', attached to the upper surface of frame A. A short shaft J, adapted to receive a suitable hand crank on its outer end to rotate the same, is journaled in one side of member H and has a beveled gear-wheel K secured on its inner end for engagement with a similar beveled gear-wheel L, secured on shaft E near the lower end thereof, and another beveled gear-wheel M mounted loosely on the lower end of shaft E. Thus, upon rotation of shaft J, rotary motion will be imparted to shaft E through shaft J and gears K and L. Shaft E, being rotated, will cause block E' to be fed up or down thereon, depending upon the direction of rotation of shaft J, and thus raise or lower the front end of platform C as desired.

The sides of tipping platform C have grooves or slots N formed adjacent the upper surface of the platform by means of members P secured to the sides and spaced from the upper surface of the platform. These slots N receive runways or rails S which can be slid on rollers R, secured on the upper face of platform C, to lie substantially within the platform, or they may be extended into the position shown to serve as tracks for another vehicle X which can be hauled up the incline, formed when platform C is tipped, on to the platform C by means of a suitable winch W, located on the frame A of the vehicle. The vehicle X which is loaded on to tipping platform C is preferably provided, in addition to the usual wheels D, with smaller outer wheels or enlarged hubs F, the latter being of such diameter as to engage the upper surfaces of members P as vehicle X is drawn up runways S and raise vehicle X slightly so as to move its wheels D out of contact with and thus take the load off of runways S, so that the runways may be moved into normal position within tipping platform C. Winch W may be hand-operated or power-driven as desired. As illustrated, it is intended to be driven by means of the automobile engine which, of course, also serves to drive the traction wheels B. For this purpose there is suspended beneath the forward portion of frame A a counter-shaft O by means of suitable brackets Q and Q' attached to the frame. Shaft O is adapted to be driven by suitable gearing T, at its forward end, connecting it to a shaft of the automobile transmission-gearing located in gear-box U, while at its opposite end suitable gearing V serves to rotate the shaft of windlass W and through cable W' which is attached to vehicle X, draw the latter up runways S and on to platform C. A clutch Y, operated by a hand-lever Z, provides means for connecting or disconnecting the windlass and the automobile engine.

The advantage of the vehicle of the present type is that a single automobile or the like vehicle can operate in conjunction with a number of trailer vehicles.

Assuming the parts to be in the positions shown in Figure 1 with the tipping platform C in normal horizontal position and the runways S moved into their inmost position, when it is desired to load and transport a trailer vehicle, the runways S are moved by hand to their extended position, as shown in full lines in Figure 1. Platform C is then tipped on its horizontal axis by rotation of shaft J by means of a suitable crank, thus raising the forward end of platform C and bringing runways S into contact with the ground. Cable W' is then connected to the forward end of the trailer vehicle X and, with the automobile engine running, clutch Y is thrown in to operate windlass W and thus draw the trailer vehicle X up runways S. Upon the continued movement of the trailer vehicle up the runways the smaller wheels F of vehicle X will engage the upper surfaces of members P, thus causing members P to serve as runways for vehicles X for the remainder of its movement on to tipping platform C. When vehicle X arrives at the desired position on platform C, clutch Y is thrown out by means of lever Z and the loaded vehicle brought to a standstill. Tipping platform C is then lowered to its normal horizontal position by reverse movement of shaft J and the runways shoved within the tipping platform.

We declare that what we claim is:—

1. A vehicle comprising in combination, a platform, wheels supporting said platform, a tipping platform mounted on said main platform, means to swing said tipping platform about a horizontal axis and an extensible run-way on said tipping platform.

2. A vehicle comprising in combination, a platform, wheels supporting said platform, a tipping platform mounted on said main platform, means to swing said tipping platform about a horizontal axis, extensible run-ways on said tipping platform, and a winch on said main platform for hoisting a load, such as a second vehicle on to said tipping platform.

3. An automobile vehicle comprising a platform, wheels supporting said platform, a source of power for driving said wheels, a tipping platform, means to swing said tipping platform about a horizontal axis on said main platform, extensible run-ways on said tipping platform, a winch and means to connect said source of power to said winch at will.

In witness whereof, we have hereunto signed our names this 24th day of August 1922, in the presence of two subscribing witnesses.

ALFRED ERNEST JACKSON.
HOWARD GOODFELLOW.

Witnesses:
G. C. DYMOND,
F. M. JONES.